United States Patent

Huang

[11] Patent Number: 6,148,072
[45] Date of Patent: *Nov. 14, 2000

[54] METHODS AND SYSTEMS FOR INITIATING VIDEO COMMUNICATION

[75] Inventor: Tapeng Huang, San Jose, Calif.

[73] Assignee: Advis, Inc, Fremont, Calif.

[*] Notice: This patent is subject to a terminal disclaimer.

[21] Appl. No.: 09/175,210

[22] Filed: Oct. 19, 1998

Related U.S. Application Data

[63] Continuation-in-part of application No. 08/778,527, Jan. 3, 1997, Pat. No. 5,859,904.
[60] Provisional application No. 60/068,112, Dec. 19, 1997.

[51] Int. Cl.$^7$ .............................. H04M 7/00; H04M 1/57; H04M 3/42; H04N 1/00; H04N 1/17
[52] U.S. Cl. ..................... 379/219; 348/17; 358/435; 370/536; 370/902; 370/912; 375/260; 379/100.06; 379/100.12; 379/142; 379/201; 379/257
[58] Field of Search ................................. 348/13, 14, 16, 348/17; 358/400, 435; 370/536, 902, 912; 375/260; 379/100.06, 100.12, 142, 201, 207, 219, 257

[56] References Cited

U.S. PATENT DOCUMENTS 5,442,457   8/1995   Najafi .................................. 379/100.12
5,859,904   1/1999   Huang ...................................... 379/219

*Primary Examiner*—Harry S. Hong

[57] ABSTRACT

A two-line videophone can be used to initiate video communication while maintaining audio communication throughout the initiation period. A user uses a first line to initiate an analog voice call with another user. The videophone then uses a modem to initiate a video (including image and voice) link on a second line. During this initialization period, the first line continues to carry the analog audio communication. After the video link on the second line is established, voice communication can be switched to the second line. The system then uses another modem to initiate a separate video link on the first line. During the setting up of the digital link on the first line, video communication (including voice and images) continues to be carried on the second line. Consequently, there is no gap in audio communication. After the digital link on the first line is established, both the first and the second lines can be used to carry video communication.

8 Claims, 6 Drawing Sheets

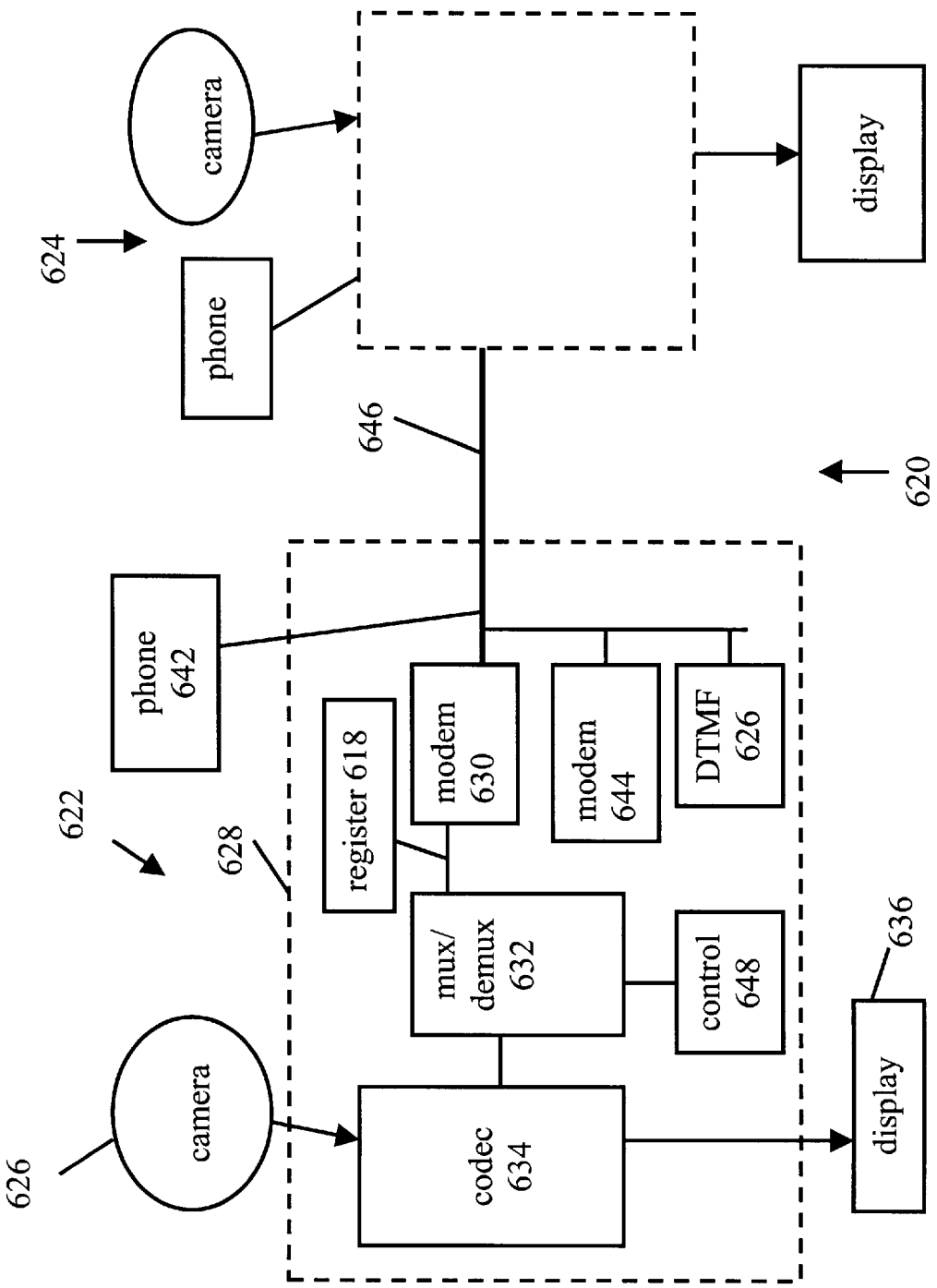

METHODS AND SYSTEMS FOR INITIATING VIDEO COMMUNICATION

CROSS REFERENCE TO RELATED APPLICATIONS

This application is a continuation-in-part of U.S. patent application Ser. No. 08/778,527 filed Jan. 3, 1997, now U.S. Pat. No. 5,859,904, and claims the benefit of U.S. provisional patent application, Ser. No. 60/068,112 filed Dec. 19, 1997. These patent applications are incorporated herein by reference.

BACKGROUND OF THE INVENTION

The present invention relates to videophones, and more specifically, to a method and system for videophones to initiate video communication while maintaining audio Videophones are becoming popular because they permit visual communication without the need for traveling to a meeting place (by one or both parties of the communication). The saving in time and money in using videophones could be very significant. For a number of years, special telephone lines (such as ISDN) are used by videophones to meet the large bandwidth requirements of video communication. It is realized that videophones could be more useful if ordinary analog phone lines (called the "Plain Old Telephone Services", or POTS, lines) can be used for videophone communication. Recently, the International Telecommunication Union (ITU) promulgated a recommendation to support videophone over POTS and is entitled "Terminal for Low bitrate Multimedia Communication," designated as H.324.

Although POTS lines are the most widely available and least expensive telephone lines, there are disadvantages in using them for videophone communication. The most important disadvantages is probably the bandwidth limitation, currently at 33.6 kilobits per second (kbps). The effect of this limitation is that image quality and motion speed are less than desirable. A solution proposed by the present inventor, as described in PCT publication number WO 98/17053, is to use multiple telephone lines to increase the total bandwidth. As a result, the quality of videophone over POTS could be better than ISDN videophones.

Many conventional videophones require users to initiate a voice call first before a video call can be commenced. One reason for this design is for protecting the privacy of users. In these conventional videophones, audio communication is temporarily interrupted during the initiation of video communication. This is because videophones use modems, which need time to conduct digital handshaking and establish digital video communication. Normal audio telephone communication is temporarily suspended during these activities. It is found that many people feel uncomfortable when normal audio communication is lost in the middle of a telephone conversation. Consequently, it is desirable to maintain audio connection between the users during the whole phone call (i.e., both the audio-only period and video period).

Another problem with conventional videophone is that the modem handshaking may not be successful, and the telephone line may be dropped as a result. There may be a period of confusion after the line is dropped. The natural tendency of a user facing this situation is to redial the telephone number immediately. When both users redial at approximately the same time, the call cannot be established because the telephone system would indicate that the lines are busy. On the other hand, if both users wait for the other user to re-initiate a voice call the phone could be silence for a long time. This difficulty could be avoided if a voice link is always present at all times. In this case, the users can discuss on the phone the appropriate way to re-initiate the video link immediately after the link fails.

SUMMARY OF THE INVENTION

The present invention involves a method and system that use two or more telephone lines to initiate video communication. A user uses a first line to initiate an analog voice call with another user. When one or both users desire to conduct a video call, the system uses a modem to initiate a digital video (including image and voice) link on a second line. During this initialization period, the first line continues to carry the analog audio communication. After the video link on the second line is established, voice communication can be switched to the second line. The system then uses another modem to initiate a separate video link on the first line. During the setting up of the digital link on the first line, video communication (including both voice and images) continues to be carried on the second line. Consequently, there is no gap in audio communication. After the digital link on the first line is established, both the first and the second lines can be used to carry video communication. As a result, the total bandwidth of the system is increased.

These and other features of the present invention will become apparent from the following description when read in conjunction with the accompanying drawings.

BRIEF DESCRIPTION OF THE DRAWINGS

FIG. 2A is a block diagram of a videophone communication system of the present invention.

DETAILED DESCRIPTION OF THE INVENTION

The present invention is directed to a novel system and related methods for enhancing the bandwidth of telephone lines. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1A:
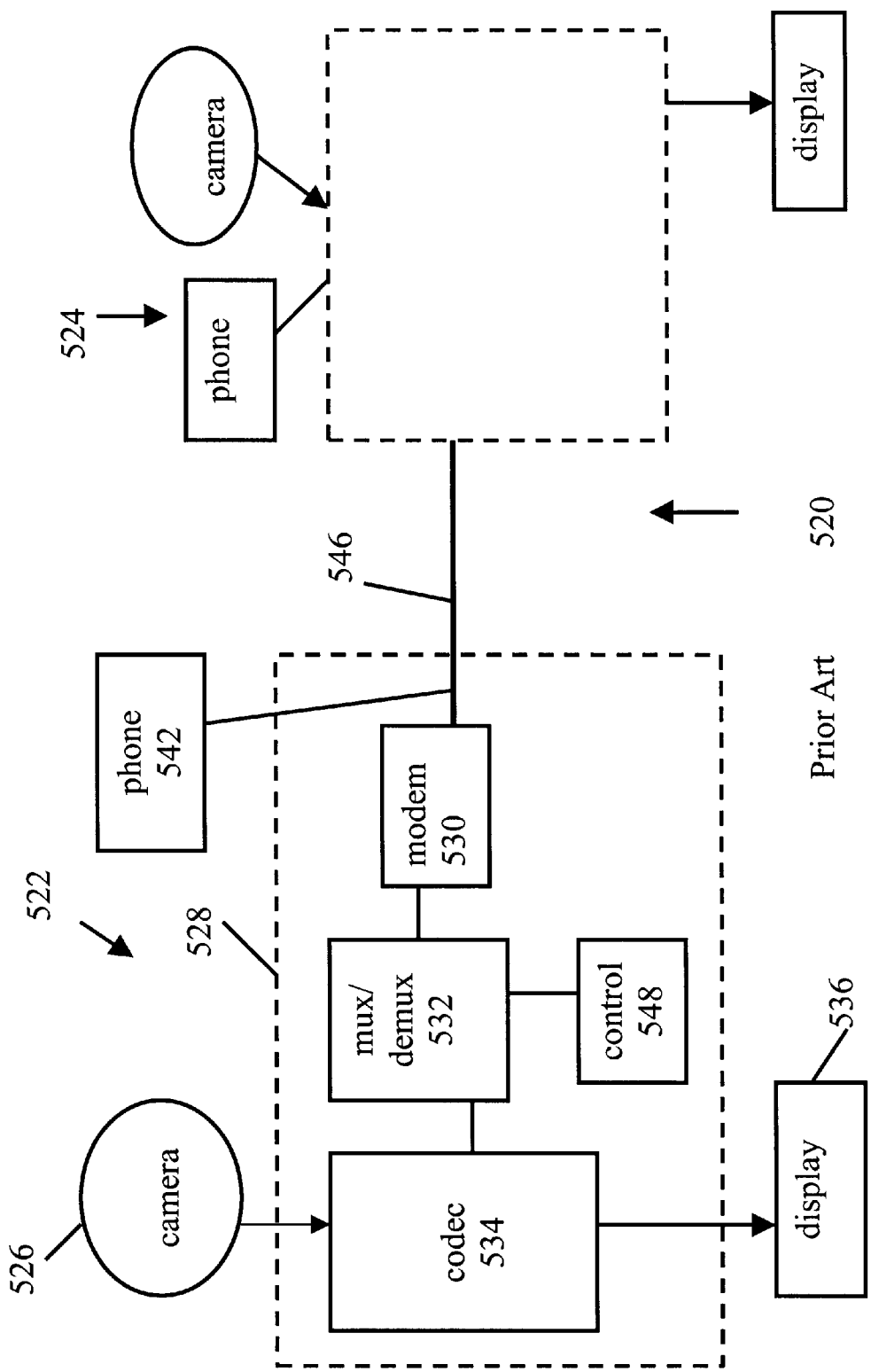
FIG. 1A is a block diagram of a conventional videophone communication system.

A block diagram of a conventional videophone communication system 520 (comprising two videophone systems 522 and 524) is shown in FIG. 1A. A block diagram of a videophone system 550 in compliance with ITU's recommendation H.324 for a single line system is shown in FIG. 1B.

Figure 1B:
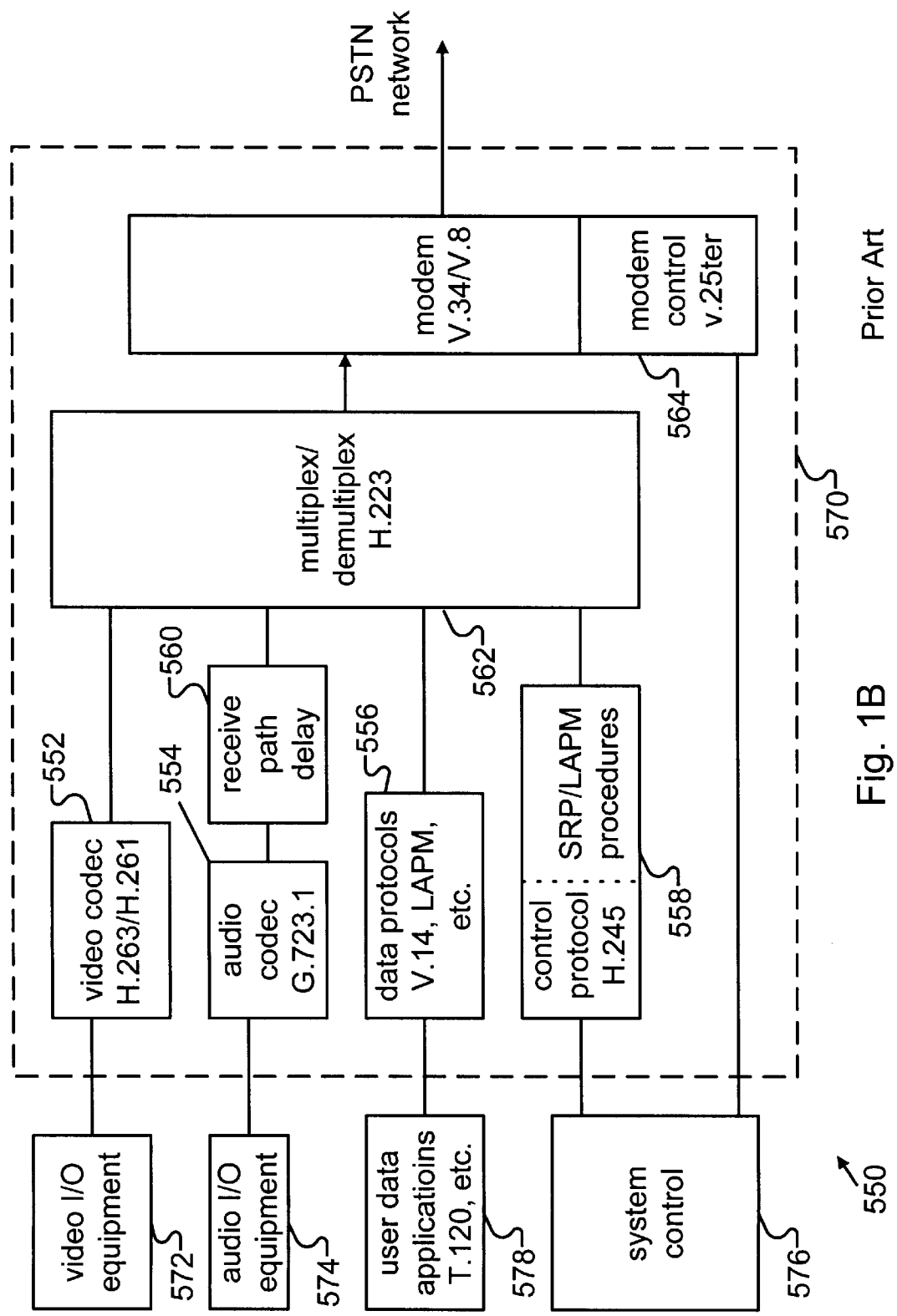
FIG. 1B is a block diagram of a prior art videophone.

In FIG. 1B, both the video and audio inputs are digitize and pass through a video codec 552 (conforming to ITU's H.263 and/or H.261 recommendations) and an audio codec 554 (conforming to ITU's G.723.1 recommendation), respectively. Under G.723.1, the bit rate used for audio communication can be either 5.3 or 6.3 kbit/s. The modem 564 used in system 550 generally has a bit rate of around or over 28.8 kbit/s. Because only a portion of the bandwidth of a telephone line is used for audio communication, the other portion can be used for video and control purposes. A multiplex/demultiplex 562 (conforming to ITU's H.223 recommendation) is used to combine the digital data If videophone system 550 receives data from a remote videophone, multiplex/demultiplex 562 is used to separate the combined digital data of the remote videophone. Videophone system 550 also contains a data protocol module 556 (for interacting with user data applications 578) and a control protocol module 558 (for interacting with a system control unit 576). If videophone system 550 is not used to transmit data, there is no need to have data protocol module 556 and data application 578.

In FIG. 1A, the two videophones 522 and 524 are substantially the same. Thus, only one is shown with detailed numeral references. Videophone 522 consists of a set-top box 528. The structure of this box is similar to block 570 of FIG. 1B. Set-top box 528 is connected to a video camera 526, a display device 536 and a telephone set 542. Set-top box 528 contains a codec block 534 that corresponds to video codec 552 and audio codec 554 of FIG. 1B. Similarly, mux/demux block 532, control block 548 and modem 530 correspond to multiplex/demultiplex 562, control 558 and modem 564, respectively, of FIG. 1B. Modem 530 is connected to a telephone line 546.

In using the videophone communication system 520 of FIG. 1A, a user uses telephone set 542 to call the telephone set of videophone 524. In this disclosure, videophone 522 is arbitrarily labeled "local" and videophone 524 is arbitrarily labeled "remote." The remote side answers the call thereby establishing analog voice communication between the two telephone sets. When both sides agree to initiate video communication, digital signal in accordance with H.324 will be generated. It is known that a modem needs time to initiate video communication. For example, H.324 describes a set of procedures to set up channels, exchange capabilities of remote and local videophones, etc., prior to actual audio and video communication. This initiation period takes approximately 30 seconds. During this initiation period, all human voice and visual contacts are lost. The user may hear a series of digitally-generated modem tones. The videophone could display text and graphic images on display device 536 during the initiation period. However, these images are generated locally by the videophones, and are not a result of interaction between the local and remote videophones.

Many users may feel uncomfortable during the initiation period because they are isolated from the parties they like to communicate. Another problem is the confusion in re-establishing telephone communication when modem link is unsuccessful. Consequently, it is desirable to maintain audio connection between the users during the whole phone call.

The present invention is a method and system to address these problems. One aspect of the present invention is the ability to maintain voice communication during the whole telephone call. As a result, the communication is more nature and the above mentioned confusion can be eliminated.

A videophone that can be used to implement the method and system of the present invention has been disclosed in a PCT patent application PCT/US97/18526 (PCT publication number WO 98/17053) relating to an invention by the present inventor. This PCT application is incorporated herein by reference. This videophone is able to utilize two or more telephone lines for the purpose of expanding the bandwidth. One aspect of the present invention is to use this videophone to maintain continuous audio connection throughout the call. FIG. 2A shows a videophone communication system 620 that is used to implement this aspect of the present invention. Elements that are substantially the same in FIG. 1A and FIG. 2A have numeral references differ in number by one hundred (i.e., element 524 in FIG. 1A is the same as element 624 in FIG. 2A). New elements in FIG. 2A includes a second modem 644, a dual-tone multiple frequency (DTMF) device 646 (which could be a detector and/or generator of DTMF signals) and a register 618 for storing a telephone number. Device 646 could be a single chip or consists of multiple chips. Note that videophone system 622 may contain more than two modems to further increase the bandwidth.

Figure 2B:
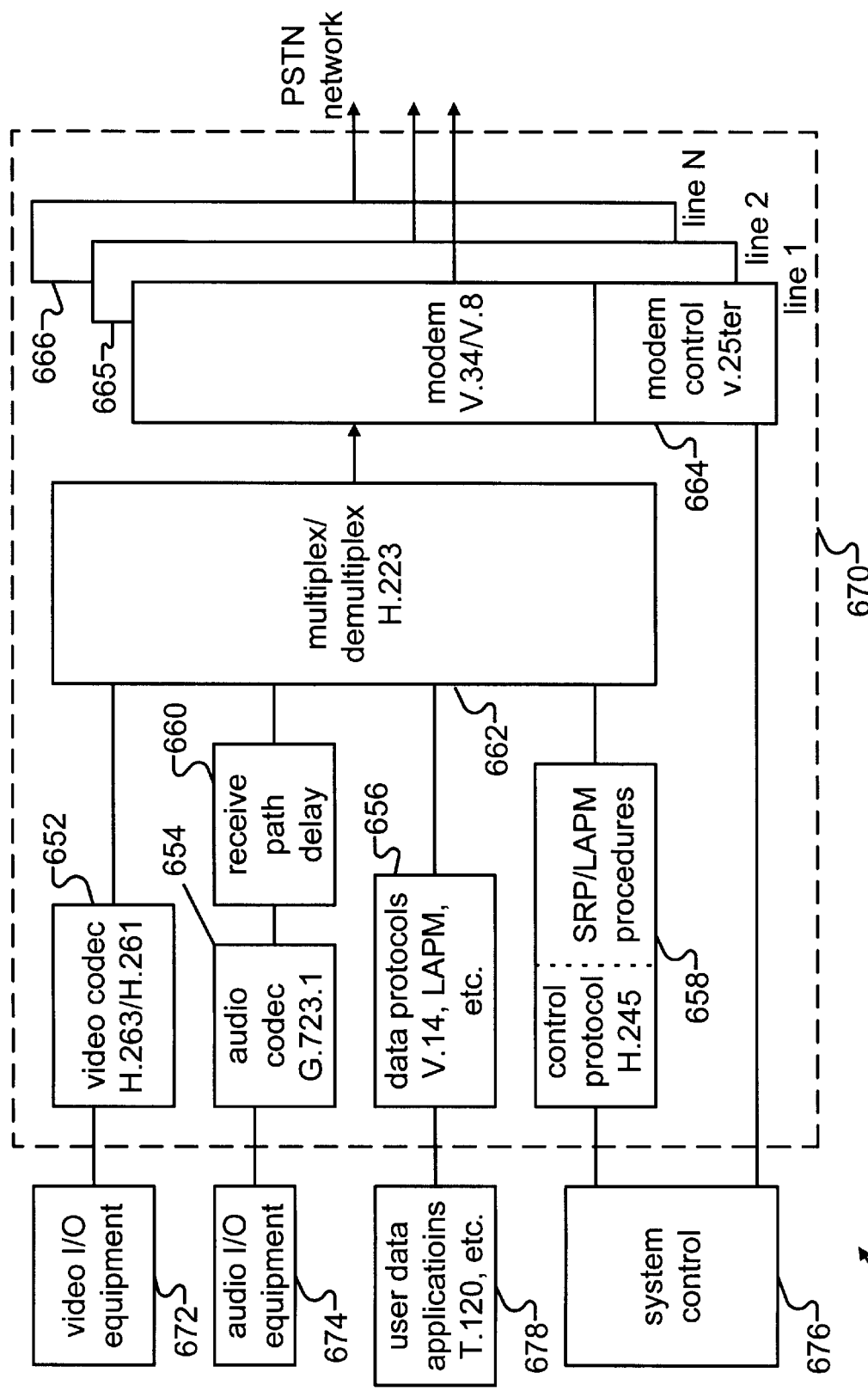
FIG. 2B is a block diagram of a videophone that can be used in accordance with the method of the present invention.

A block diagram of the videophone system 650 used in the present invention is shown in FIG. 2B. Elements that are substantially the same in FIG. 2B and FIG. 1B have numeral references differ in number by one hundred (i.e., element 554 in FIG. 1B is substantially the same as element 654 in FIG. 2B). In order to use two telephone lines, videophone system 650 of FIG. 2B contains one additional modem 665. It should be understood that it is possible for videophone 650 to contain more than two modems. For example, FIG. 2B also shows a third modem 666.

Figure 3:
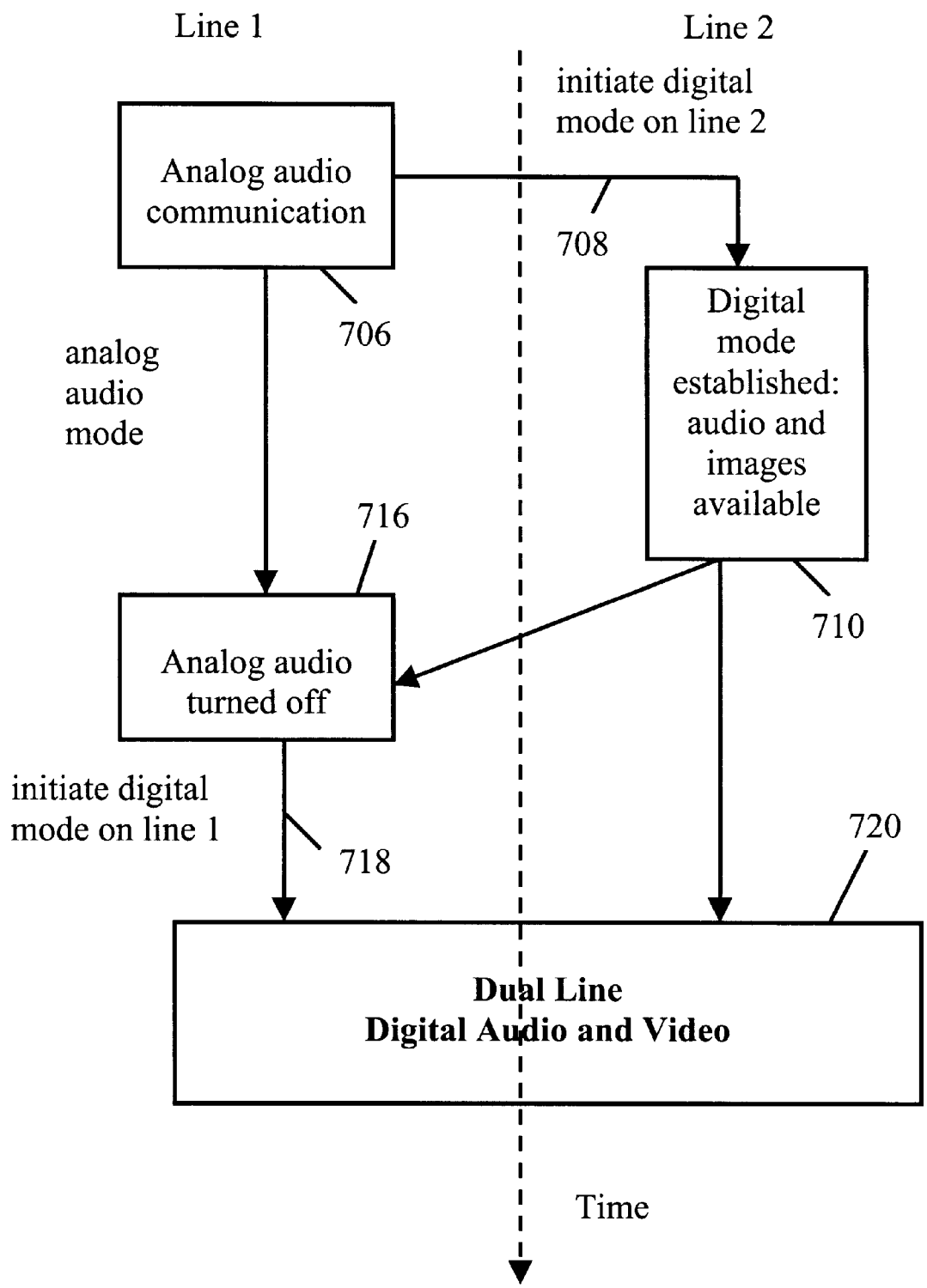
FIG. 3 is a schematic diagram illustrating the method of the present invention.

FIG. 3 is a schematic diagram showing the method of the present invention. The local and remote telephones first establish analog audio connection using line 1 (state 706). For example, a user uses phone set 642 of videophone 622 to call videophone 624. The dialed number is recognized by DTMF detector 626 and stored in register 618. The caller and receiver then agree to seeing each other using the videophones. In this illustration, it is assumed that videophone 622 of FIG. 2A is the videophone that initiates digital connection. For easy description, it is assumed that modem 630 of videophone 622 is connected to line 1 and modem 644 is connected to line 2. After a user indicates a desire to do video communication (by, e.g., press a button on videophone 622), videophone modem 644 on line 2 initiates digital dialing (step 708). As pointed out above, initialization step 708 may takes about 30 seconds. At the conclusion of the initiation period of step 708, digital mode is established, and digitally generated video (voice and images) of the other videophone appears (state 710) on display 636 of videophone 622. Up to this time, audio communication between the remote and local telephones remains active on line 1. However, shortly (or immediately) after the establishment of state 710, modem 630 of line 1 begins to call (digitally) the modem of the remote videophone, and analog audio communication on line 1 is cut off (state 716). The telephone number can be retrieved from register 618. Modem 630 now undergoes an initiation period (step 718). However, the users can still maintain audio communication because (digital) audio connection of line 2 has previously been established. Consequently, the users can still talk to each other during this period. During step 718, the local and remote videophones determine that two telephone lines are available for digital transmission. Consequently, a communication protocol is set up to use the bandwidth of these two lines. A dual-line videophone communication can begin (state 720).

As disclosed in the above-mentioned PCT application, each videophone stores its second telephone number in its memory. When it is time to establish video communication, one of the two videophones (e.g., the first videophone) passes its second telephone number to the second videophone through a previously established telephone communication channel. The second videophone can automatically dial the second telephone number to establish a second connection. There is no need for the user of the second videophone to manually dial the second telephone number. The transmission of a telephone number would be easy if a digital communication link has previously been established. In the call initiation method of the present invention, the second telephone number needs to be delivered while the videophones are in analog audio mode (i.e., state 706 of FIG. 3). Consequently, a new method is disclosed here for transmitting telephone number information via an analog link.

Figure 4:
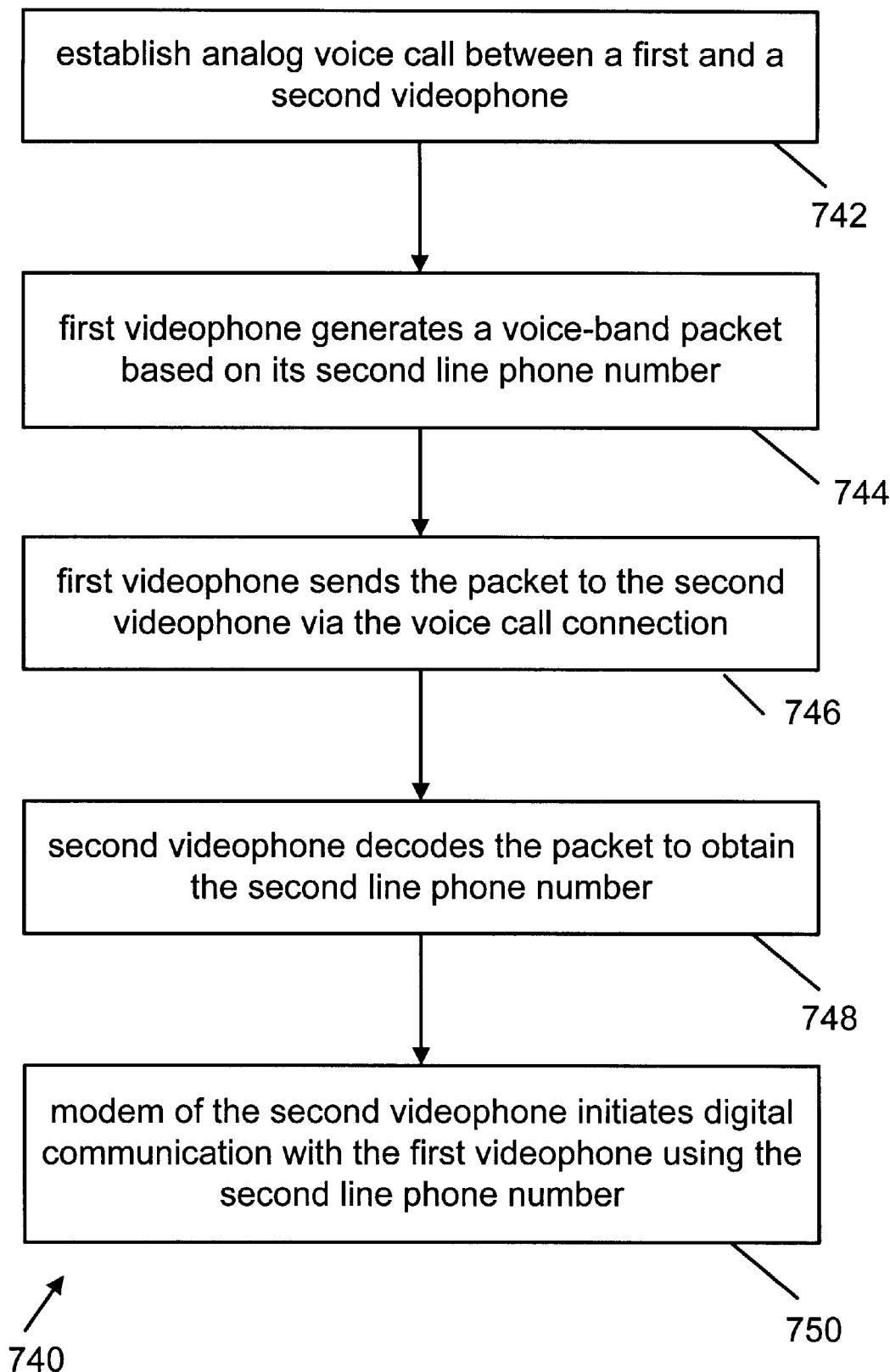
FIG. 4 is a flow chart showing a method for passing telephone numbers in accordance with the present invention.

FIG. 4 is a flow chart 740 showing a number passing method of the present invention. In step 742, analog voice call between a first and a second videophone is established. In step 744, one of the videophones (e.g., the "first" videophone) generates a voice-band packet based on its second line telephone number. The packet and the telephone number have a one-to-one relationship so that the second videophone can decode the telephone number from the packet. In step 746, this packet is sent to the second videophone via the already established voice channel. In step 748, the second videophone decodes the packet, and recovers the second telephone number. In step 750, the modem of the second videophone dials the second telephone number to initiate digital communication with the first videophone. This step corresponds to step 708 of FIG. 3.

In one embodiment of the present invention, the voice-band packet comprises a plurality of DTMF signals. The DTMF signals could be generated by DTMF signal generator/detector 626. Some users may be annoyed by the DTMF signals during a regular telephone call. In another embodiment of the present invention, a piece of music can be used to camouflage the DTMF signals. In this case, when a user indicates to the videophone that video communication is desired, one of the videophones transmits the piece of music together with the DTMF signals corresponding to the second telephone number. DTMF generator/detector 626 can pick up the DTMF tones while the music is played.

It is possible that DTMF generator/detector 626 may not be able to pick up the DTMF signals if these signals are overwhelmed by the music. In a preferred embodiment of the present invention, the relative volume of the DTMF signals and music signals can be adjusted. For example, if DTMF generator/detector 626 cannot successfully decode the DTMF signals, the DTMF signals having a higher relative volume are sent again (together with the same or different piece of music). After a predetermine number of failed attempts, only DTMF signals and no music is sent so as to ensure a successful decoding.

The invention has been described with reference to specific exemplary embodiments thereof. Various modification and changes may be made thereunto without departing from the broad spirit and scope of the invention. For example, the above described method is not limited to videophone applications, and can be applied to different kinds of digital data communication. Further, the second telephone channel does not have to be used as a digital channel. The specification and drawings are, accordingly, to be regarded in an illustrative rather than a restrictive sense; the invention is limited only by the provided claims.

What is claimed is:

1. A method for connecting a first and a second device using a plurality of telephone lines, said first device containing a first modem connected to a first telephone line associated with a first telephone number and a second modem connected to a second telephone line associated with a second telephone number, said second device containing a first modem connected to a third telephone line associated with a third telephone number and a second modem connected to a fourth telephone line associated with a fourth telephone number, said method comprising the steps of:

establishing a voice communication channel between said first telephone line and said third telephone line;

generating, by said second device, a voice-band packet representing said fourth telephone number;

sending by said second device said voice-band packet to said first device via said voice communication channel;

receiving said packet by said first device;

decoding by said first device said fourth telephone number from said received packet; and dialing, by said second modem of said first device, said fourth telephone number to initiate a first digital call to said second device, said first digital call including voice related digital data.

2. The method of claim 1 wherein a phone set connecting to said first telephone line is used to dial said third telephone number and wherein said first device contains a register, said method further comprising the steps of:

capturing said third telephone number dialed by said phone set;

storing said captured third telephone number into said register;

terminating said voice communication channel after initiation of said first digital call; and dialing, by said first modem of said first device, said third telephone number stored in said register to initiate a second digital call to said second device.

3. The method of claim 1 wherein a phone set connecting to said third telephone line is used to dial said first telephone number and wherein said second device contains a register, said method further comprising the steps of:

capturing said first telephone number dialed by said phone set;

storing said captured first telephone number into said register;

terminating said voice communication channel after initiation of said first digital call; and dialing, by said first modem of said second device, said first telephone number stored in said register to initiate a second digital call to said first device.

4. The method of claim 1 wherein said first digital call is used to communicate digitized voice and video data.

5. The method of claim 2 wherein said first and said second digital calls are used to communicate digitized voice and video data.

6. The method of claim 3 wherein said first and said second digital calls are used to communicate digitized voice and video data.

7. The method of claim 1 wherein said voice-band packet comprises a plurality of DTMF signals.

8. The method of claim 1 wherein said voice-band packet comprises a piece of music and a plurality of DTMF signals.

* * * * *